No. 728,717. PATENTED MAY 19, 1903.
R. L. HUNTER.
FISHING REEL.
APPLICATION FILED JULY 31, 1899.
NO MODEL. 3 SHEETS—SHEET 1.
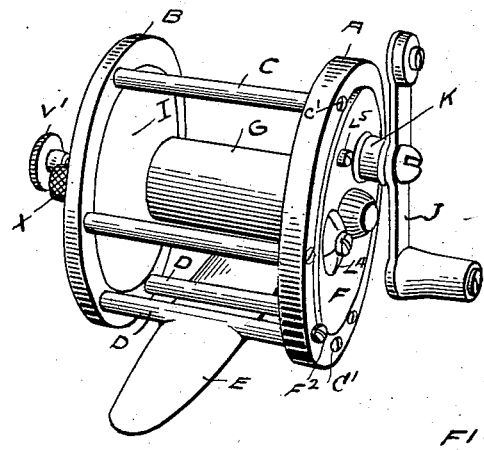
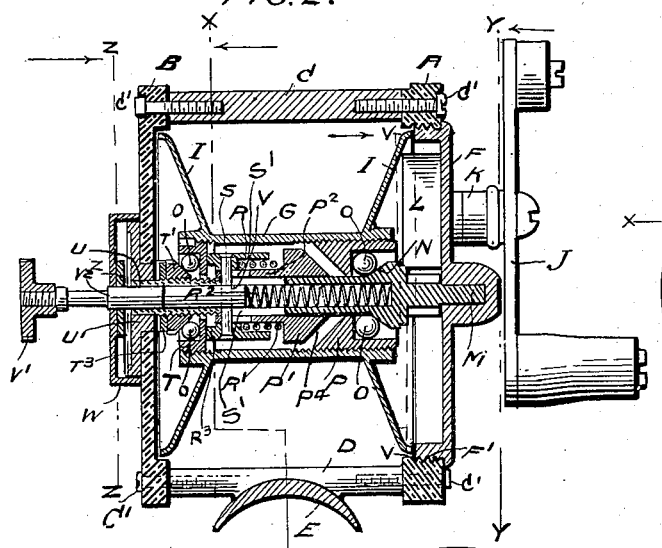
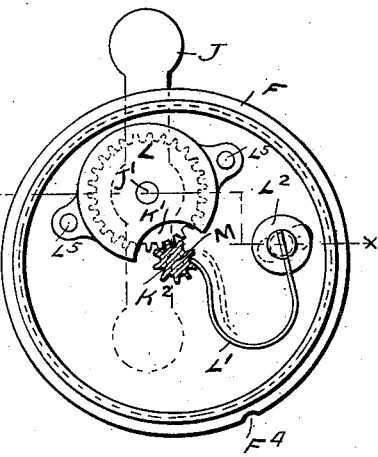
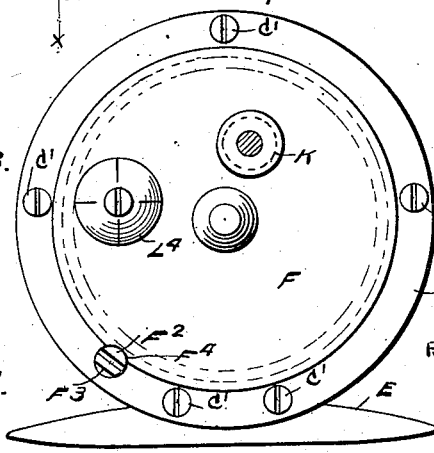
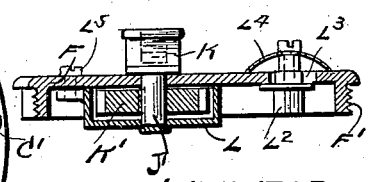
WITNESSES.
INVENTOR.
ROBERT L. HUNTER
BY
HIS ATTORNEYS No. 728,717. PATENTED MAY 19, 1903.
R. L. HUNTER.
FISHING REEL.
APPLICATION FILED JULY 31, 1899.
NO MODEL. 3 SHEETS—SHEET 2.
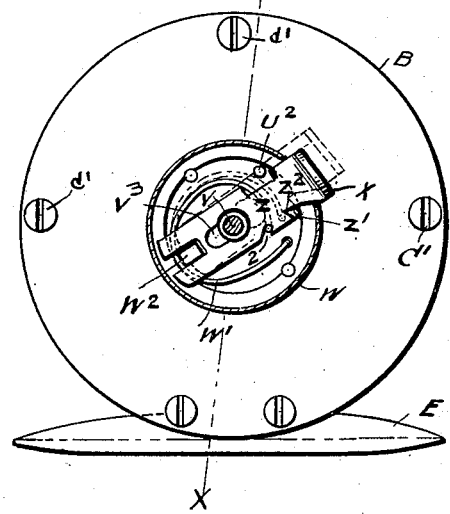
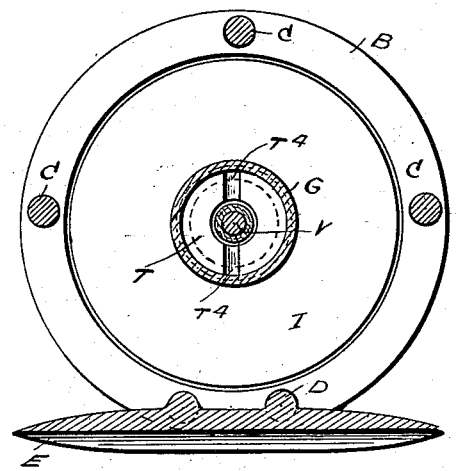
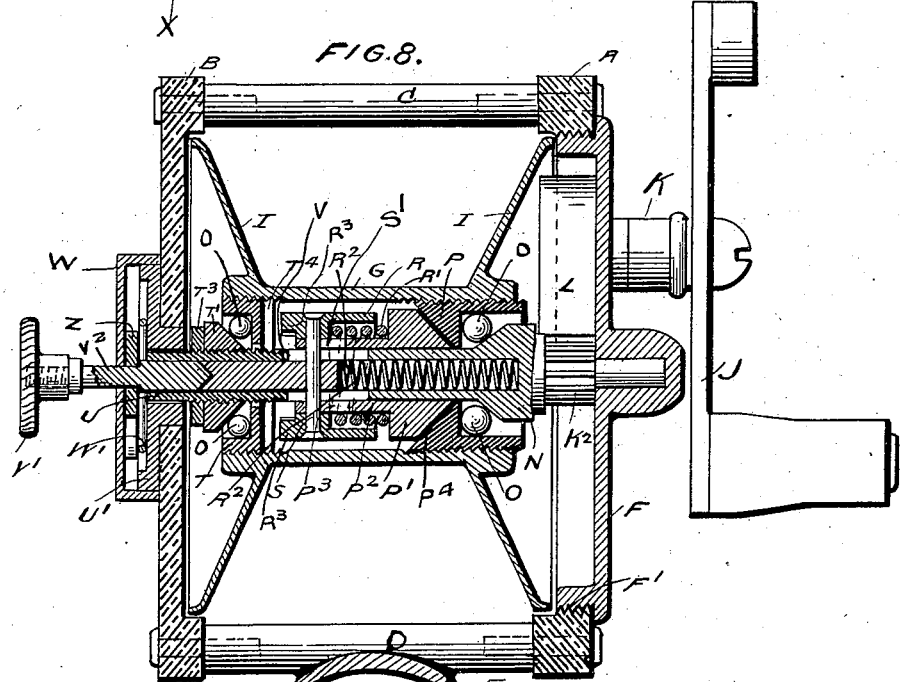
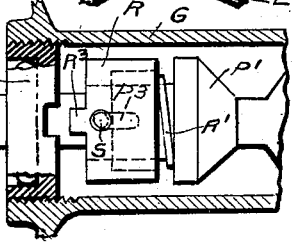
WITNESSES
INVENTOR
ROBERT L. HUNTER
BY
HIS ATTORNEYS No. 728,717. PATENTED MAY 19, 1903.
R. L. HUNTER.
FISHING REEL.
APPLICATION FILED JULY 31, 1899.
NO MODEL. 3 SHEETS—SHEET 3.
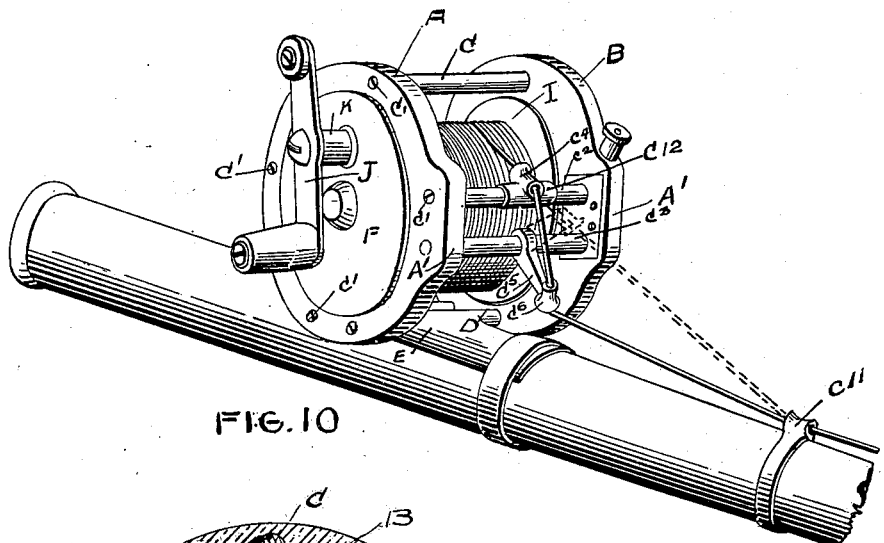
FIG. 10.
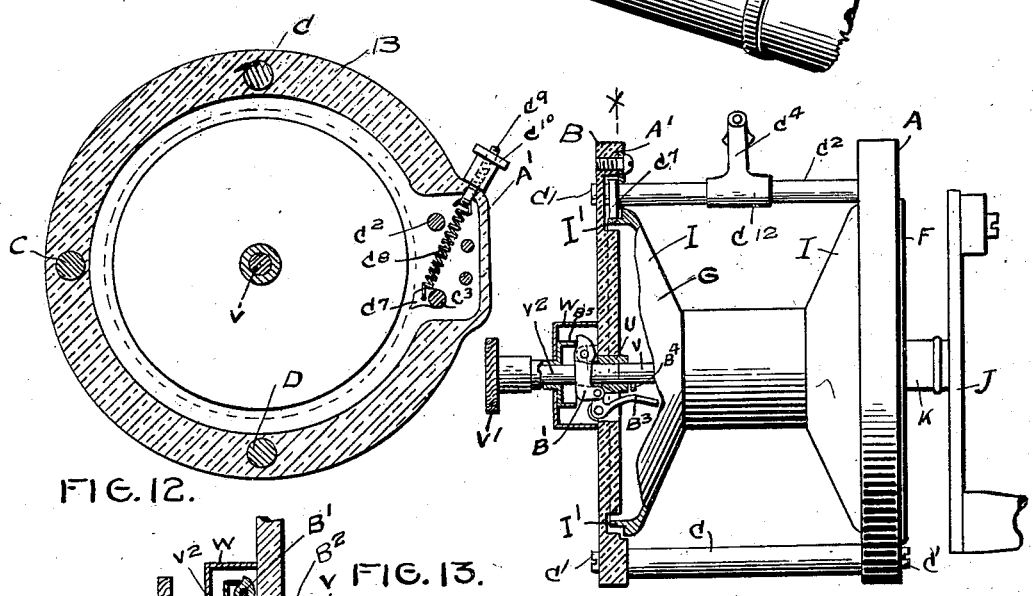
FIG. 12.
FIG. 13.
FIG. 11.
INVENTOR
ROBERT L. HUNTER
BY Paul & Hawley,
HIS ATTORNEYS.
WITNESSES,
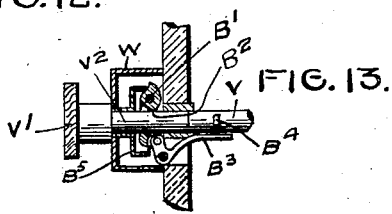

No. 728,717. Patented May 19, 1903.

UNITED STATES PATENT OFFICE.

ROBERT L. HUNTER, OF MINNEAPOLIS, MINNESOTA, ASSIGNOR TO THE AMERICAN SIGNAL AND POWER CO., OF MINNEAPOLIS, MINNESOTA, A CORPORATION.

FISHING-REEL.

SPECIFICATION forming part of Letters Patent No. 728,717, dated May 19, 1903.

Application filed July 31, 1899. Serial No. 725,562. (No model.)

*To all whom it may concern:*

Be it known that I, ROBERT L. HUNTER, of the city of Minneapolis, county of Hennepin, State of Minnesota, have invented certain new and useful Improvements in Fishing-Reels, of which the following is a specification.

This invention relates to improvements in fishing-reels; and the objects I have in view are, first, to provide a reel with antifriction-bearings that are as nearly indestructible as possible; second, to provide a reel with a spool that can be disengaged from the operating shaft and gearing, permitting the use of the free spool; third, to provide a reel in which the spool and working parts may be quickly and readily removed from the inclosing cage (without removing screws or other devices) for the purpose of permitting the line to be untangled, the parts of the reel to be oiled, or for other purposes; fourth, to provide a reel which will prevent backlash or overrunning of the line.

Other objects of the invention will appear from the following detailed description, taken in connection with the accompanying drawings, in which—

Figure 1 is a perspective view of a fishing-reel embodying my invention. Fig. 2 is a longitudinal vertical section of the same, the spool being coupled to the operating-shaft by means of a clutch, thereby constituting the reel a tight-spool reel. Fig. 3 is a section on line $y\,y$ of Fig. 2 looking in the direction of the arrow. Fig. 4 is an inside elevation of the removable end or cap of the cage, the central pinion being shown in section and the view being taken substantially on the line $v\,v$ of Fig. 2 looking in the direction of the arrow. Fig. 5 is a section of the removable cap, the view being taken on the line $x\,x$ of Fig. 4. Fig. 6 is a section on the line $z\,z$ of Fig. 2 looking in the direction of the arrow. Fig. 7 is a section on the line $x\,x$ of Fig. 2 looking in the direction of the arrow. Fig. 8 is a transverse vertical section on the line $x\,x$ of Fig. 6. Fig. 9 is a detail of a portion of the clutch and a portion of the barrel of the spool, showing the means for engaging the spool with the reel-shaft. Fig. 10 is a perspective view showing the reel arranged about a fishing-pole and illustrating the operation of the backlash device. Fig. 11 is an elevation and partial section showing the arrangement of the backlash-brake and showing also a modified means for locking the "push" when the spool is free. Fig. 12 is a section on line $x\,x$ of Fig. 11, showing the backlash-brake and means for adjusting the same. Fig. 13 is a detail.

The reel herein illustrated consists, primarily, of three main parts—a cage, a spool for the line mounted upon bearings within the cage, and mechanism for operating the spool. The cage itself in its general features is of ordinary construction, consisting of the end plates A and B and the parallel rods C and D, to which said plates are connected by means of the screws C'. The rods D, which are arranged at the bottom of the reel, have secured to them the usual clamping-plate E. This cage may be of the usual construction, except that the end plate A is in the form of a ring and its center consists of a separate plate F, that is secured to the ring A by a screw-thread or other detachable connecting means, which permits said plate to be quickly removed without the necessity of removing screws or other ordinary fastening devices, and when this plate is removed the entire mechanism of the reel can be immediately removed through the open end of the cage. This permits the user of the reel to remove the spool and the working parts of the reel from the cage at any time, and this removal can be effected by simple manipulation of parts and without the use of any tools. This makes it possible for the fisherman to at once remove the spool and the working parts of the reel from the cage should it be desirable to do so for the purpose of oiling the bearings, disentangling the line, removing sand or dirt from any part of the reel, or for any other purpose.

The removable plate F is provided with a boss K, through which passes the short shaft J', carrying upon its outer end the usual crank-handle J and having secured to it within the plate F the pinion K'. The pinion K' is covered by the cap-plate L, secured upon the inside of the plate F by the screws $L^5$, an opening being left at one side of the plate to permit the pinion K' to engage with the pinion $K^2$ on the driving-shaft M of the reel. (See Fig. 4.) The cap-plate L also furnishes the inner bearing for the shaft J'. (See Figs. 4 and 5.) For the purpose of furnishing a "click" for the reel a spring L' is secured to a stud L², which extends through a slot L³ in the plate F. A spring-washer L⁴ is arranged over the end of the stud L² and is held thereto by a suitable screw. By this means the spring L' may be thrown into or out of engagement with the pinion K², as represented by full and dotted lines in Fig. 4. This click is of usual construction and may be used or not, as preferred, or any other suitable device for the purpose may be substituted for that herein shown and described.

The spool proper consists of the hollow barrel G, preferably interiorly screw-threaded at both ends, as shown in Figs. 2 and 8, and the flanges I, preferably flaring outwardly and arranged near the ends of the barrel G. The driving-shaft M is supported at one end in a hole or socket in the plate F (see Figs. 2 and 8) and extends entirely through the reel, its opposite end U being mounted in a metal plate U', (see Figs. 2 and 8,) that is secured to the plate B, forming one end of the cage. The shaft M is hollow for the greater part of its length, and a spring R² is arranged within it, as shown in Figs. 2 and 8. Near one end this shaft is provided with the cone N, and near its opposite end it is screw-threaded for the purpose of receiving a removable cone T', which is held in position thereon by means of the nut T³, which is screwed onto the threaded portion of the shaft. A locking-washer may also be used in connection with said nut and cone. A short shaft V V² is arranged inside of the hollow shaft M, and the spring R² bears against the end of said shaft. A pin S extends transversely through the inner end of the part V of this shaft and through slots S' in the shaft M. This permits the shaft V V² to move longitudinally in the hollow shaft M, while compelling the part V to rotate always with said shaft M, while the part V² remains stationary. The outer end of the part V² of this shaft is made of smaller diameter than the main portion of the shaft, and a threaded thumb-nut or push V' is screwed on the end of the shaft. Screwed into the opposite ends of the spool-barrel G are the sleeves P and T, each of which forms a ball-race for a series of antifriction-balls O, arranged between the inner surface of said sleeves and the cones N and T'. The ball-races P and T are each in the form of a socket, and the balls O are confined between the inner surface of said ball-races and the respective cone-surfaces N and T'. It will be seen, therefore, that the reel-spool is mounted upon antifriction-bearings, and the ball-races P and T and the cone T' being adjustable the play may be taken up as the parts become worn by use. Ordinarily it will not be necessary to move the ball-races P and T after they have been placed in position in the spool; but by adjusting the cone T' the wear in the bearings may be taken up. The inner end of the sleeve or ball-race P is provided with the conical surface P⁴, and a sleeve P², provided with a cone P', is arranged upon the shaft M, as shown in Figs. 2 and 8. The sleeve P² is provided with the slots P³, and the pin S passes through these slots, thereby compelling the sleeve to rotate with the shaft M. A sleeve R is arranged outside of the sleeve P², and the pin S passes through said sleeve. A spring R' is arranged outside of the sleeve P² and between it and the sleeve R. One end of said spring bears against a shoulder on the sleeve P² and the other against a shoulder on the inside of the sleeve R, thereby normally holding the cone P' on the sleeve P² as near the cone N on the shaft M as the slot P³ in the sleeve P² will permit. (See Fig. 8.) The sleeve R is also provided with the lugs or projections R³, (see Figs. 8 and 9,) which are adapted to engage the grooves or recesses T⁴, formed on the inner end of the sleeve T. These parts form a clutch, by means of which the reel-spool may be connected with or disconnected from the driving-shaft M. When in their normal position, the parts of the clutch will be held in engagement, as shown in Fig. 2, on account of the tension of the spring R². This spring, it will be seen, tends to move the shaft V V² out of the hollow shaft M and thereby forcing the parts of the clutch into engagement one with the other, and at the same time moves the sleeve P² so as to bring the cone P' thereon out of engagement with the cone-surface P⁴ on the sleeve P. (See Fig. 2.) When the parts are in this position, I have a tight-spool reel which has antifriction-bearings interposed between the spool and shaft, but at such time locked out of use by the direct clutch connection.

On the outside of the plate B, I prefer to arrange the cap-plate W, through which the shaft V V² passes centrally. A sliding locking-plate Z is arranged to pass transversely through the cap-plate W, and it is provided with a turned-up end X, preferably milled, (see Fig. 1,) which comes outside of the cap-plate W. The inner end of the locking-plate Z is provided with a slot which engages a parallel-sided lug W², which forms a guide for said plate, there being sufficient space, however, between the sides of said lug and the walls of the slot to permit the opposite end of the plate a slight lateral movement in the plane of the plate. This plate is provided substantially at its center with a keyhole-slot V³, and the shaft V V² passes through this slot, the reduced portion of the shaft passing freely through the small portion of the slot and the larger portion of the shaft passing freely through the larger portion of the slot. A spring W' has one end secured to the bearing-plate U' on one end of the cage and its other end engaging a slot 2 in the locking-plate Z. Another slot Z³ in said plate is adapted to engage a pin Z', arranged in the plate U'. The other side of the plate Z is also preferably slotted, and a pin $U^2$ serves as a step to limit the outward movement of the locking-plate Z. These parts are clearly shown in Fig. 6 of the drawings.

When the parts of the clutch hereinbefore described are in engagement and the spool of the reel is locked to the shaft, the locking-plate Z is in the position shown by full lines in Fig. 6 and the large portion of the shaft $V V^2$ passes through the large part of the slot $V^3$, as shown in Figs 2 and 6. When it is desired by the user of the reel to make a cast, the thumb or finger is applied to the push $V'$ and the shaft $V V^2$ is forced inward against the tension of the spring $R^2$ until the parts of the clutch are disconnected. The locking-plate Z is then moved so as to bring its shoulder $Z^2$ out of engagement with the pin $Z'$, and instantly said plate is moved by the spring $W'$ into the position indicated by dotted lines in Fig. 6. The small portion of the shaft $V V^2$ now passes through the small part of the slot $V^3$ (see Fig. 8) and the shoulder between the large and the small parts of the shaft $V V^2$ comes against the inner surface of the plate Z, and further outward movement of the shaft $V V^2$ is prevented. The shaft V is therefore locked in this position against the tension of the spring $R^2$ and the parts of the clutch are held out of engagement. The spool of the reel is now entirely free from the shaft and operating mechanism and is supported upon ball-bearings, and the user can make a cast and have the line run freely from the spool without overrunning of the line, which with the ordinary reels is caused by the momentum of the crank, which, being ordinarily weighted at both ends, serves as a fly-wheel and compels the spool of the reel to turn after the line has ceased to run out, thereby winding the line backward on the spool. Where the spool is thus completely freed from the driving mechanism, the line in running out in making a cast only causes the spool to acquire such an amount of momentum as is caused by its own motion, and the spool is readily stopped the instant that the line has run out the desired distance by applying the thumb to the surface of the line on the spool, or "thumbing" the line, as it is called. Instead of stopping the spool by thumbing the line I may apply pressure after the cast is made and while the line is running out, or just at the time the hook and bait strike the water, to the push $V'$, pushing the shaft $V V^2$ inward and bringing the cone $P'$ into contact with the cone-surface $P^4$ on the sleeve P. This applies a brake to the spool and stops its movement at the desired instant.

In some instances I prefer to provide the reel with an automatic brake to prevent backlash or overrunning of the line in making the cast. For this purpose I provide the end plates A and B of the cage with the projections $A'$, (see Figs. 10 and 12,) and in these projections I locate the extra transverse rods or bars $C^2 C^3$. The rod $C^2$ is stationary and has arranged thereon one half of a trumpet-guide $C^4$, which is preferably secured upon a sliding sleeve $C^{12}$. The other rod $C^3$ is free to turn upon its axis and is provided with an arm $C^5$, carrying the other half of a trumpet-guide $C^6$, which is adapted to coöperate with the partial guide $C^4$ on the rod $C^2$. The plate B, forming one end of the cage of the reel, is provided with a recess, and the flange I of the spool is provided with a ring or rim $I'$, which extends into said recess. A dog $C^7$ is secured on the end of the rod $C^3$ within the projecting portion $A'$ of the cage, (see Fig. 12,) and the end of this dog is adapted to engage the outer surface of the ring $I'$ on the spool. A spring $C^8$ is connected to the dog $C^7$, and its opposite end is connected to a screw $C^9$ at the top of the projection $A'$. A nut $C^{10}$ engages the screw $C^9$, and by means of this nut and screw the tension of the spring $C^8$ may be regulated. The normal position leaves the brake set. When the pole is laid down, the reel is locked out. In operation the line from the reel passes through the stationary guide $C^4$, through the guide $C^6$ on the arm $C^5$, and through the first guide $C^{11}$ on the pole, as shown in Fig. 10. In making a cast as the line runs off from the reel and through the guides on the pole it causes the partial guide $C^6$ to be turned upward into line or substantially into line with the guides $C^4$ and $C^{11}$. This moves the brake $C^7$ away from the edge of the spool and permits the spool to turn freely. The instant that the tension on the line ceases the spring $C^8$ will draw the brake $C^7$ into engagement with the spool and check its movement. The spool will therefore be automatically stopped as soon as the tension is removed and backlash or overrunning of the line will be prevented.

In some instances I prefer to provide an automatic catch connected with the push and longitudinally-moving shaft, by which the parts of the clutch are disengaged. This catch engages the part $V^2$ of the shaft $V V^2$ and holds the parts of the clutch separated or disengaged. I may also arrange means in connection with this catch for causing it to release the part $V^2$ of the shaft $V V^2$ as soon as the operator by taking hold of the crank begins to turn the main operating-shaft. In Figs. 11 and 13 I have shown a construction of catch that may be employed for this purpose, although I do not confine myself to the details thereof. As here shown, the part $V^2$ of the shaft $V V^2$ passes through a slot in a pivoted lever $B'$, the edge of the slot at $B^2$ forming a gripping-surface adapted to hold the shaft inward against the tension of the spring $R^2$. The opposite end of the lever $B'$ is pivoted to a bell-crank lever $B^3$, having its long end projecting into the cage of the reel and lying in proximity to the shaft V, which is provided at this point with a stud or projection $B^4$. The part $V^2$ of the shaft has connected to it a flanged sleeve $B^5$, which is adapted to engage the end of the lever B'. The operation of this part of the device is as follows: The parts being in position shown in Fig. 11, if it is desired to use the reel with a free spool the operator pushes inward the shaft V V², thereby disengaging the parts of the clutch and leaving the spool entirely free from the driving mechanism and main shaft. The flange of the sleeve B⁵ engaging the end of the lever B' turns this lever from the position shown in Fig. 11 to the position shown in Fig. 13, and the gripping edge on the lever at the side of the slot engaging the surface of the non-rotatable part V² of the shaft V V² will hold said shaft V V² in its inner position against the tension of the spring R² and with the parts of the clutch separated. The spool will then be entirely free and supported upon its antifriction-bearings. The end of the bell-crank lever B³ will now lie close to the shaft V, as shown in Fig. 13, and when it is desired to connect the spool to the operating-shaft it is only necessary to turn the crank J a slight amount, when the projection B⁴ on the shaft V will engage the lever B³, causing it to turn the lever B' and release the shaft V V², permitting it to be moved outward by the spring R², and thereby to cause the parts of the clutch to engage each other, and the spool will thereafter turn with the operating-shaft. In Figs. 11 and 13 I have shown only the parts that are necessary to explain the operation of the automatic catch and releasing device for the clutch mechanism.

I have shown in several figures of the drawings the shaft V V² as made in two parts, the inner part V being free to slide longitudinally in the central opening in the driving-shaft, but being compelled to turn with said shaft by the transverse pin S. The outer part of the shaft V² also is capable of longitudinal movement in the central opening in the driving-shaft, being adapted to be moved inward by pressure applied to the push V' and to be moved outward by the expansive force of the spring R². The part V of the shaft is not, however, compelled to turn with the driving-shaft, and it may, if preferred, be positively prevented from such movement. If preferred, however, the shaft V V² may be made all in one piece, in which case, of course, the entire shaft will turn with the driving-shaft. This does not, however, affect the operation of the other parts of the reel, and where the automatic catch is employed the construction may be simplified by having the shaft V V² connected together or made integral, as in that instance the lever B³ may be dispensed with and the projection B⁴ on the shaft, which engages the lever B³ in the construction shown, may be made to engage directly with the lever B'. I do not wish to be limited, however, to the details of construction of this automatic catch and releasing device, as many different constructions to accomplish the same result may be employed in place of that herein shown and described, and I believe myself to be the first to provide any form of automatic catch and releasing device in a fishing-reel for the purpose herein specified.

It will be seen that my improved reel combines all the advantages of three separate reels. It may be, first, a tight spool-reel capable of being used in the same way ordinary reels are used; second, it may be used in casting as a free-spool reel, to which the thumb of the user may be applied as a brake, or the interior friction-brake, consisting of the two cone-surfaces hereinbefore described, may be used to regulate the movement of the spool, if desired; third, the automatic brake may alone be depended upon to brake the spool and prevent backlash or overrunning of the line. The entire working parts of the reel may also be at once removed from the reel-cage by simply unscrewing the plate F and removing the nut V', when all of the working parts, with the exception of the locking-plate Z and its spring W', may be drawn out through the open end of the cage.

I do not limit myself to the details of the construction herein shown and described, as it is obvious the same may be varied in many particulars without departing from my invention.

Having thus described my invention, I claim as new and desire to secure by Letters Patent—

1. In a fishing-reel, the combination, with the operating-shaft, of the spool mounted on said shaft, a clutch for connecting said spool and shaft, and a friction-brake connected to and moving with said clutch, for the purpose set forth.

2. In a fishing-reel, the combination with the operating-shaft, of a spool mounted to turn freely thereon, a combined clutch and friction-brake, either of which is adapted to engage said spool, and means for operating said clutch and brake.

3. In a fishing-reel, the combination, with the hollow operating-shaft, of the spool mounted by antifriction-bearings on said shaft, the spring R² arranged within said shaft and a clutch adapted to engage with the barrel of the spool and connect the same with said shaft, said spring normally holding said clutch in engagement with said barrel, for the purpose set forth.

4. In a fishing-reel, the combination, with an operating-shaft, a free spool, a clutch adapted to connect said shaft and spool, means for holding said clutch out of engagement with said spool, and means for automatically engaging said clutch with said spool upon the turning of said operating-shaft.

5. In a fishing-reel, the combination, with a main driving-shaft, a spool mounted on antifriction-bearings thereon, a clutch arranged to connect said shaft and said spool, a spring tending to hold said clutch in engagement with said spool, means for moving said clutch out of engagement with said spool, a catch for holding said clutch out of engagement with said spool against the tension of said spring, and means for automatically tripping said catch upon the turning of said shaft.

6. In a fishing-reel, the combination, with a suitable spool arranged to turn freely upon its bearings, means for connecting or disconnecting said spool with the operating mechanism, a catch for holding the operating mechanism from engagement with said spool and an automatic trip for said catch, for the purpose set forth.

7. The combination, with the fishing-reel cage and spool, of a pivoted bell-crank, one arm of which is a dog adapted to engage said spool, a spring acting normally to hold said dog in engagement with said spool, a movable guide in the other arm of said bell-crank, and means whereby when tension from the line is exerted upon said guide, said dog will be disengaged from said spool, for the purpose set forth.

8. The combination, with the fishing-reel cage and spool, I, provided with the ring I', of the pivoted dog $C^7$, a spring $C^8$ tending to hold said dog in engagement with said ring, and a movable guide adapted to draw said dog out of engagement with said ring, as tension from the line is exerted upon said guide, for the purpose set forth.

9. In a fishing-reel, the combination, with the frame or cage, of the shaft having bearings therein, the spool, ball-bearings therefor whereon the same is adapted to rotate independently of said shaft, a clutch provided upon said shaft within said spool to connect said spool and shaft, means for driving said shaft, and means within said shaft operable from the exterior of said frame to disengage the shaft and spool, substantially as described.

10. In a fishing-reel, the combination, with the frame or cage, of the shaft having bearings therein, the spool, ball-bearings therefor whereon the same is adapted to rotate independently of said shaft, a clutch provided upon said shaft within said spool to connect said spool and shaft, means for driving said shaft, and means within said shaft operable from the exterior of said frame to disengage the shaft and spool, and means for automatically engaging said shaft and spool when the shaft is rotated, substantially as described.

11. In a fishing-reel, the combination, of the reel-cage having one end provided with an open center, with a detachable plate for covering said open center, the spool, the spool-shaft whereon said spool is mounted, said shaft having a bearing in said detachable plate, means connecting said spool and shaft and adapted for operation to disconnect the same, and the shaft-driving mechanism provided on said detachable plate and removable therewith, the removal of said detachable plate permitting the withdrawal of the spool and shaft from the cage, substantially as described.

12. In a fishing-reel, the cage, in combination, with the spool-shaft having bearings in said cage, the spool, ball-bearings upon said shaft for said spool, at opposite ends thereof, the operating-crank and gear arranged upon said cage and engaged with said shaft to operate the same, and a clutch arranged within said spool between the ball-bearings thereof, connecting said shaft and spool and adapted for operation to disconnect the same and free said spool from the shaft, substantially as described.

13. In a fishing-reel, the cage, in combination, with the spool-shaft having bearings therein, a spool mounted upon said shaft and having bearings thereon at its opposite ends, a clutch arranged within the spool between the bearings thereof, clutch-operating means extending through said shaft, means upon said cage for actuating the clutch-operating means, and means in the cage for rotating said shaft, substantially as described.

14. In a fishing-reel, the cage, in combination, with the spool-shaft having bearings therein and held against longitudinal movement, shaft-rotating means, a spool having bearings on the shaft, a clutch provided on the shaft between the bearings of the spool, and means operating longitudinally in said shaft to operate said clutch, substantially as described.

15. In a fishing-reel, the cage, in combination, with the spool, the spool-shaft having bearings in said cage and held against longitudinal movement, said spool having bearings on said shaft, clutch and brake devices, slidable upon said shaft between the bearings of said spool thereon, to connect said shaft and spool, means for operating said devices, and means for driving said shaft, substantially as described.

16. In a fishing-reel, the cage, in combination, with the spool-shaft having bearings therein, the operating-crank for driving said shaft in either direction and positively engaged therewith, the spool having bearings upon said shaft, a spring-pressed clutch on said shaft, connecting the same and said spool, and means longitudinally movable in said shaft to disengage said clutch from the spool, substantially as described.

17. In a fishing-reel, the combination, with the cage, of the spool-shaft having bearings in said cage, the spool having bearings upon said shaft, the clutch and brake devices slidable upon said shaft, opposing parts upon the spool for said clutch and brake, a spring tending to engage said clutch with the spool, and axially-mounted means in said shaft movable to first disengage the clutch and thereafter move said brake into engagement with the spool, substantially as described.

18. In a fishing-reel, the combination, with the cage, of the spool-shaft having bearings therein, means for rotating said shaft, the spool having bearings upon said shaft, spring-pressed clutch and brake devices arranged upon said shaft between the bearings of said spool thereon, and means entering the space between said bearings through said shaft, and operable to actuate said clutch and brake, substantially as described.

19. In a fishing-reel, the combination, with a cage, of a shaft mounted in bearings in the ends of said cage, a portion of said shaft being hollow, a spool mounted upon ball-bearings upon said shaft, a clutch arranged within said spool for connecting said spool and said shaft, and means extending through the hollow portion of said shaft for operating said clutch.

20. In a fishing-reel, the combination, with a cage, of a shaft having bearings therein, means for driving said shaft, ball-cones upon said shaft, a spool, ball-runways therein, balls arranged in said runways, a spring-pressed clutch slidable upon said shaft, one member of said clutch being formed by one of said runways, and means for operating said clutch.

21. In a fishing-reel, the combination, of a cage, with a shaft mounted therein, the ball-bearing cones secured upon said shaft, one thereof having a pinion, the spool provided with ball-runways, the balls of the bearings, the clutch upon said shaft to engage said spool, means for operating said clutch, and means for driving said pinion, substantially as described.

22. A fish-line reel having in combination, a rotatable winding member, a brake member movable relatively thereto, a push-button located at the axis of said winding member and connected with one of said members, whereby inward pressure upon the push-button will force the brake and winding members into frictional contact and resist the turning of the winding member, and a supporting-frame for said parts, substantially as described.

In testimony whereof I have hereunto set my hand, this 18th day of July, at Minneapolis, Minnesota.

ROBERT L. HUNTER.

In presence of—
C. E. HAWLEY,
M. E. GOOLEY.